United States Patent
Kim et al.

(10) Patent No.: US 7,468,936 B2
(45) Date of Patent: Dec. 23, 2008

(54) RECORDING AND/OR REPRODUCING METHODS AND APPARATUSES

(75) Inventors: Jin Yong Kim, Seongnam-si (KR); Sang Woon Suh, Seoul (KR)

(73) Assignee: LG Electronics Co., Ltd., Seoul (KR)

( * ) Notice: Subject to any disclaimer, the term of this patent is extended or adjusted under 35 U.S.C. 154(b) by 0 days.

(21) Appl. No.: 11/714,897

(22) Filed: Mar. 7, 2007

(65) Prior Publication Data

US 2007/0153653 A1   Jul. 5, 2007

Related U.S. Application Data

(63) Continuation of application No. 10/885,087, filed on Jul. 7, 2004.

(30) Foreign Application Priority Data

| Aug. 14, 2003 | (KR) | .............. 10-2003-0056540 |
| Sep. 15, 2003 | (KR) | .............. 10-2003-0063591 |
| Sep. 22, 2003 | (KR) | .............. 10-2003-0065628 |

(51) Int. Cl.
 G11B 5/09 (2006.01)
 G11B 7/24 (2006.01)
(52) U.S. Cl. .............. 369/47.36; 369/47.21; 369/53.2; 369/47.5; 369/275.1
(58) Field of Classification Search .............. None
 See application file for complete search history.

(56) References Cited

U.S. PATENT DOCUMENTS

| 5,361,173 A | 11/1994 | Ishii et al. |
| 5,485,469 A | 1/1996 | Suzuki |
| 5,590,096 A | 12/1996 | Ohtsuka et al. |
| 5,636,631 A | 6/1997 | Waitz et al. |
| 5,764,621 A | 6/1998 | Choi |
| 5,835,462 A | 11/1998 | Mimnagh |
| 6,415,435 B1 | 7/2002 | McIntyre |
| 6,480,450 B1 | 11/2002 | Fujii et al. |
| 6,487,713 B1 | 11/2002 | Cohen et al. |
| 6,504,806 B1 | 1/2003 | Nakajo |
| 6,535,470 B1 | 3/2003 | Wu |
| 6,643,233 B1 | 11/2003 | Yen et al. |
| 6,894,961 B1 | 5/2005 | Osakabe |

(Continued)

FOREIGN PATENT DOCUMENTS

CN   1151071   6/1997

(Continued)

OTHER PUBLICATIONS

PCT International Search Report, dated Sep. 10, 2004.
Office Action for European application dated Apr. 15, 2008.

(Continued)

*Primary Examiner*—Muhammad N. Edun
(74) *Attorney, Agent, or Firm*—Harness, Dickey & Pierce

(57) ABSTRACT

One embodiment includes providing control information, wherein the control information includes one or more recording speed flags indicating respectively whether one or more recording speeds are applicable to each of the recording layers. The control information also includes write strategy information depending on each of the applicable recording speeds, and the control information is recorded on a specific area of the recording medium.

29 Claims, 15 Drawing Sheets

U.S. PATENT DOCUMENTS

| | | |
|---|---|---|
| 6,996,047 B2 | 2/2006 | Nagano |
| 6,999,393 B2 | 2/2006 | Yamada |
| 7,012,878 B2 | 3/2006 | Shinotsuka et al. |
| 7,170,841 B2 | 1/2007 | Shoji et al. |
| 7,193,948 B2 | 3/2007 | Furukawa et al. |
| 7,218,585 B2 * | 5/2007 | Tanii et al. ............... 369/47.36 |
| 2001/0044935 A1 | 11/2001 | Kitayama |
| 2001/0053115 A1 | 12/2001 | Nobukuni et al. |
| 2002/0021656 A1 | 2/2002 | Tsukagoshi et al. |
| 2002/0044509 A1 | 4/2002 | Nakajima |
| 2002/0048241 A1 | 4/2002 | Kumagai |
| 2002/0048646 A1 | 4/2002 | Tomura et al. |
| 2002/0126604 A1 | 9/2002 | Powelson et al. |
| 2002/0126611 A1 | 9/2002 | Chang |
| 2002/0167880 A1 | 11/2002 | Ando et al. |
| 2003/0021201 A1 | 1/2003 | Kobayashi |
| 2003/0021202 A1 | 1/2003 | Usui et al. |
| 2003/0058771 A1 | 3/2003 | Furukawa et al. |
| 2003/0086345 A1 | 5/2003 | Ueki et al. |
| 2003/0137915 A1 | 7/2003 | Shoji et al. |
| 2003/0151994 A1 | 8/2003 | Tasaka et al. |
| 2003/0159135 A1 | 8/2003 | Hiller et al. |
| 2003/0223339 A1 | 12/2003 | Taniguchi et al. |
| 2003/0231567 A1 | 12/2003 | Moritomo et al. |
| 2004/0001407 A1 | 1/2004 | Kim et al. |
| 2004/0004921 A1 | 1/2004 | Lee et al. |
| 2004/0010745 A1 | 1/2004 | Lee et al. |
| 2004/0022150 A1 | 2/2004 | Lee et al. |
| 2005/0019023 A1 | 1/2005 | Ko |
| 2005/0036425 A1 | 2/2005 | Suh et al. |
| 2005/0038957 A1 | 2/2005 | Suh |
| 2006/0233059 A1 | 10/2006 | Suh et al. |
| 2008/0043588 A1 | 2/2008 | Suh et al. |

FOREIGN PATENT DOCUMENTS

| | | |
|---|---|---|
| EP | 0 265 984 | 5/1988 |
| EP | 0 552 903 | 7/1993 |
| EP | 968769 | 1/2000 |
| EP | 1172810 | 1/2002 |
| EP | 1 244 097 | 6/2002 |
| EP | 1 308 942 | 5/2003 |
| EP | 1 329 888 | 7/2003 |
| EP | 1 331 631 | 7/2003 |
| EP | 1 361 571 | 11/2003 |
| EP | 1 369 850 | 12/2003 |
| EP | 1 522 994 | 4/2005 |
| EP | 1 605 445 | 12/2005 |
| EP | 1471506 A1 | 10/2007 |
| JP | 09-160761 | 6/1997 |
| JP | 11-085413 | 3/1999 |
| JP | 2000-113458 | 4/2000 |
| JP | 2002-050053 | 2/2002 |
| JP | 2002-245625 | 8/2002 |
| JP | 2003-203341 | 7/2003 |
| JP | 2003-257026 | 9/2003 |
| WO | WO 97/13244 | 4/1997 |
| WO | WO 00/079525 | 12/2000 |
| WO | WO 02/029791 | 4/2002 |
| WO | WO 02/065462 | 8/2002 |
| WO | WO 02/089123 | 11/2002 |
| WO | WO 03/067581 A1 | 1/2003 |
| WO | WO 03/010519 | 2/2003 |
| WO | WO 03/025935 | 3/2003 |
| WO | WO 03/075265 | 9/2003 |
| WO | WO 03/105139 | 12/2003 |
| WO | WO 2004/013845 | 2/2004 |
| WO | WO 2004/072966 | 8/2004 |
| WO | WO 2005/001819 | 1/2005 |

OTHER PUBLICATIONS

Office Action for corresponding Russian application dated Jun. 23, 2008.

* cited by examiner

FIG. 6A

Disc information (112 bytes)

| byte number | contents | number of bytes |
|---|---|---|
| 0 | Disc information identifier | 2 |
| 5 | DI frame sequence number in DI block | 1 |
| ... | ... | ... |
| N | Writing speed flag | 1 |
| L | Write strategy (WS) flag | 1 |
| M | Number of recording layer | 1 |
| P~111 | Write strategy (WS) parameters | X |

FIG. 7A

Disc information (112 bytes)

| byte number | contents | Number of bytes |
|---|---|---|
| 0 | Disc information identifier | 2 |
| 5 | DI frame sequence number in DI block | 1 |
| ... | ... | ... |
| N | Writing speed flag | 1 |
| L | Write stategy (WS) flag | 1 |
| M | Number of recording layer | 1 |
| Q | Best WS flag in writing speed | 1 |
| P~111 | Write strategy (WS) parameters | X |

| b7 | b6 | b5 | b4 | b3 | b2 | b1 | b0 |
|---|---|---|---|---|---|---|---|
| WS-8 | WS-7 | WS-6 | WS-5 | WS-4 | WS-3 | WS-2 | WS-1 |
| 0b | 0b | 0b | 0b | 0b | 0b | 1b | 0b |

1b: Best WS-type

RECORDING AND/OR REPRODUCING METHODS AND APPARATUSES

DOMESTIC PRIORITY INFORMATION

This is a continuation application of application Ser. No. 10/885,087 filed Jul. 7, 2004, the entire contents of which are hereby incorporated by reference.

FOREIGN PRIORITY INFORMATION

This application claims the benefit of Korean Applications No. 10-2003-0056540 filed on Aug. 14, 2003, No. 10-2003-0063591 filed on Sep. 15, 2003, and No. 10-2003-0065628 filed on Sep. 22, 2003, which are hereby incorporated by reference.

BACKGROUND OF THE INVENTION

1. Field of the Invention

The present invention relates to a method of recording a control information on recording medium, such as a recordable optical disc having at least one recording layer, and more particularly, to a method in which writing speed information and write strategy parameters are included in the disc control information. Also, this invention relates to a method of recording or reproducing data on or from the recording medium using the writing speed information 2. Discussion of the Related Art A high density optical recording medium, known as HD-DVD, is widely used to record and store high-definition video data, large amount program data, and high-quality audio data and so on. The Blu-ray disc represents next-generation HD-DVD technology.

Technological specifications are now being established for the global standardization of the Blu-ray disc, including standards are for the write-once Blu-ray disc(BD-WO). Meanwhile, a rewritable Blu-ray disc, known as the 1×-speed BD-RE and now being discussed, should be compatible with BD-RE discs expected to have higher writing speeds, i.e., the 2×-speed BD-RE and beyond. BD-WO specifications for high writing speed are also in progress. Efficient solutions for coping with the high writing speed of a high-density optical disc are urgently needed, and the specifications established should ensure mutual compatibility.

SUMMARY OF THE INVENTION

The present invention relates to a method for recording control information on a recording medium having one or more recording layers.

One embodiment includes providing control information, wherein the control information includes one or more recording speed flags indicating respectively whether one or more recording speeds are applicable to each of the recording layers. The control information also includes write strategy information depending on each of the applicable recording speeds, and the control information is recorded on a specific area of the recording medium.

The present invention further relates to an apparatus for recording control information on a recording medium having one or more recording layers.

In one embodiment, the apparatus includes a controller for providing control information, wherein the control information includes one or more recording speed flags indicating respectively whether one or more recording speed are applicable to each of the recording layers. The control information also includes write strategy information depending on each of the applicable recording speeds. A pickup unit is configured to record the control information on a specific area of the recording medium.

The present invention also relates to a recording medium having one or more recording layers.

In one embodiment, the recording medium includes a data area configured to record user data on each recording layer, and one or more management areas configured to store control information for controlling recording/reproducing the user data. The control information includes one or more recording speed flags, which indicate respectively whether one or more recording speed are applicable to each of the recording layers, and write strategy information, which depends on each of the applicable recording speeds.

The present invention also relates to a method and apparatus for recording main data on a recording medium having one or more recording layers.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6A to 6C are diagrams of disc information recorded according to a third embodiment of the present invention;

FIGS. 7A and 7B are diagrams of disc information recorded according to a fourth embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A Blu-ray disc is taken as an example of an optical disc according to the present invention. Yet, the concept of the present invention, characterized in an optical disc having its disc control information recorded thereon, is applicable to DVD-RAM, DVD-RW, DVD+RW, DVD-R, DVD+R, and similar such discs.

Although the terminology used herein is well known for the most part, some terms have been chosen by the applicant, such that the present invention should be understood with the intended meanings of the terminology as used by the applicant. For example, the "disc control information" of a disc is recorded in a specified area, i.e., a recordable area of the disc or a prerecorded area (sometimes known as an embossed area, in which manufacturer data is recorded and where no further recording is possible), and includes information necessary for the playback of a recorded disc. Disc control information is called "disc information" or "DI" in relation to Blu-ray disc technology but is typically referred to as "physical format information" for DVD-RAM, DVD-RW, DVD+RW, DVD-R, and DVD+R discs. Hence, it should be apparent that the technical background of the present invention is equally applicable to physical format information.

Moreover, the disc information according to the present invention is recorded as an unspecified unit of information, which may be counted, for example, as a first or second information.

Figure 1:
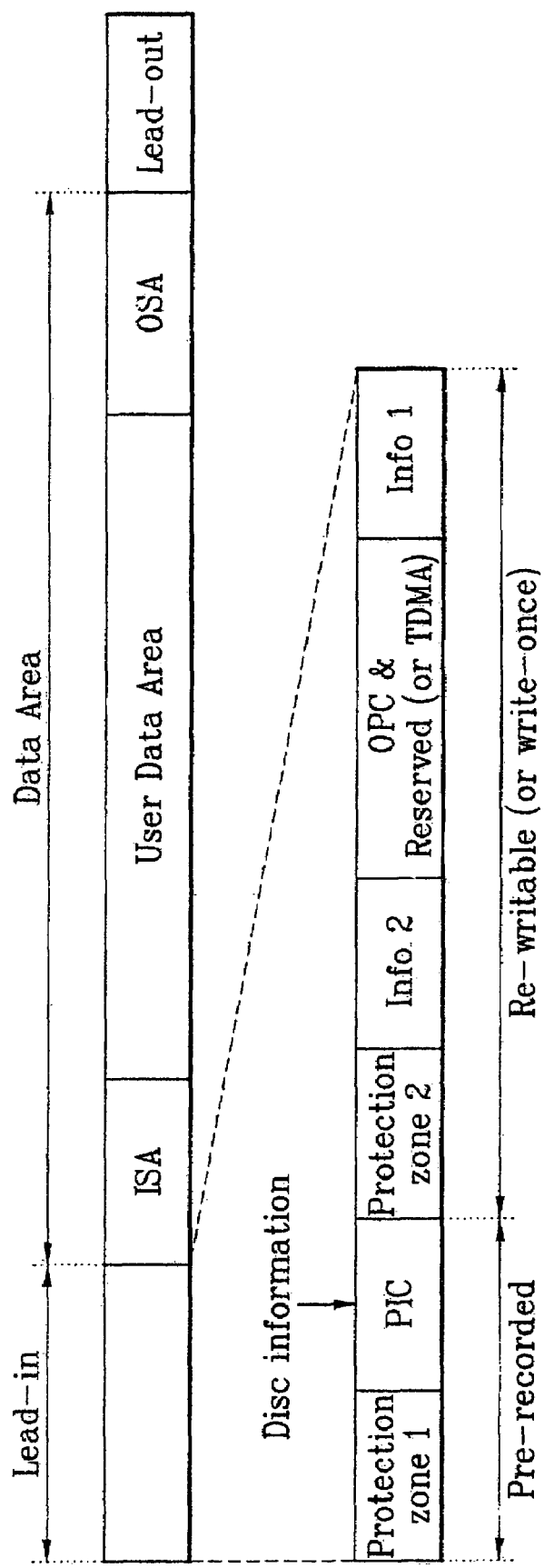
FIG. 1 is a diagram of a single-layer disc applicable to the present invention.
Figure 2:
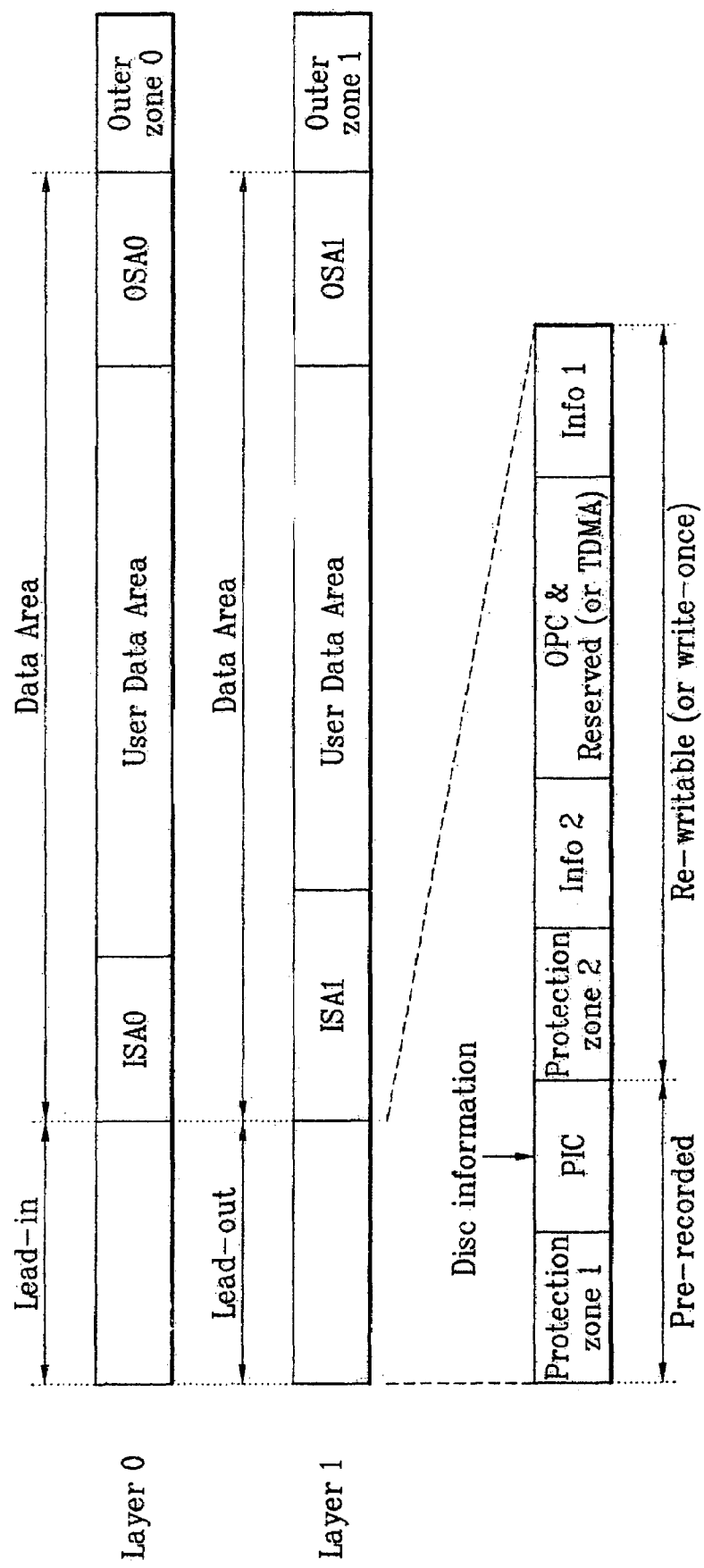
FIG. 2 is a diagram of a dual-layer disc applicable to the present invention.

FIGS. 1 and 2 illustrate the structure of optical discs according to the present invention, in which any recordable optical disc may be applicable to the present invention. The recordable disc may be, for example, a rewritable optical disc or a write-once optical disc.

Referring to FIG. 1, illustrating an optical disc having one recording layer, a lead-in area is provided as a management area on an inner circumference area of an optical disc, whereas a lead-out area is provided as a management area on an outer circumference area of the optical disc. In the inner circumference area, a pre-recorded area and a rewritable (or write-once) area are provided separately. In BD-RE and BD-WO technology, the pre-recorded area is called the PIC area, where permanent information and control data is recorded, and disc information is recorded in the PIC area. A data area is made up of a user data area where user data is recorded and inner and outer spare areas ISA and OSA, which are used in the replacement of the data of a defective area. In the case of a BD-WO disc, a temporary defect management area (TDMA) is provided for recording information of a defect and for general management. The TDMA is unnecessary in the case of BD-RE discs, which have a corresponding area designated as reserved.

The present invention intends to provide a method of recording disc information (DI) as disc control information required for recording and/or reproducing of a disc in a prerecorded or recordable are. It is apparent that a recording method in the pre-record area is differently applied to each kind of disc. In the case of BD-RE and BD-WO discs, the pre-recorded area is the PIC area recorded using a bi-phased high-frequency modulated signal reproduced according to a specific playback method, to acquire the disc information.

FIG. 2 illustrates an optical disc having dual recording layers, in which an inner circumference area of the disc has a lead-in of a first recording layer (Layer 0) corresponding to a lead-out of a second recording layer (Layer 1). In this case, one PIC area is provided in each of the lead-in and lead-out areas, and the same disc information is recorded in each PIC area.

Figure 3:
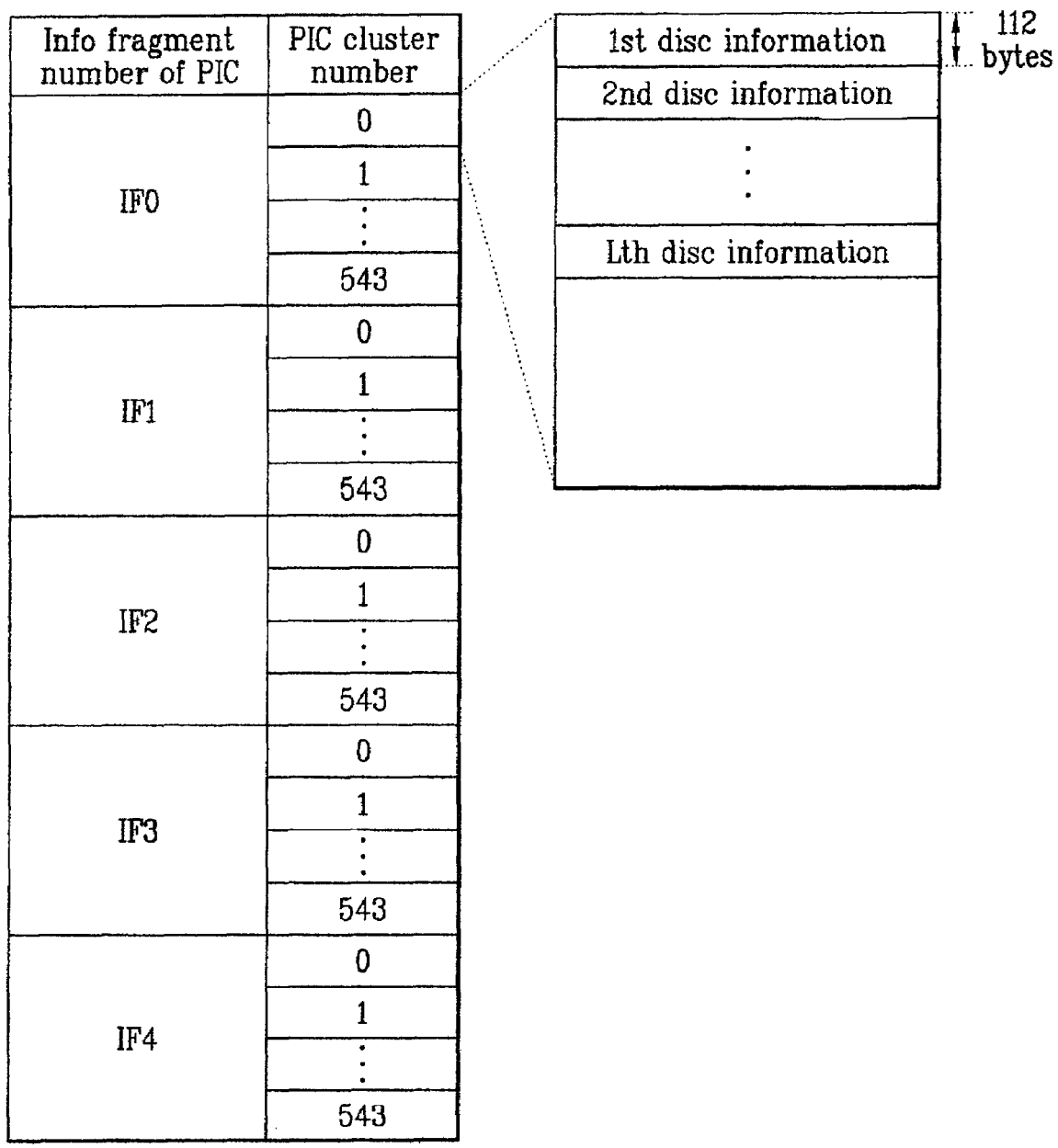
FIG. 3 is a diagram of a management area where disc control information of the present invention is recorded, in which a format of recording the disc information in a corresponding area is schematically shown.

FIG. 3 illustrates a PIC area formatted according to the present invention. In configuring the disc information of the PIC area of a BD-RE or BD-WO disc, the minimum recording unit is one cluster, 544 clusters constitute one fragment as one upper record unit, and five fragments make up the PIC area. Disc information is recorded in a front head cluster of a first fragment IFO. The disc information is plurally recorded per recording layer and recording velocity permitted by the corresponding optical disc. One disc information includes 112 bytes, sometimes referred to as a DI frame. To cope with a loss of disc information, the same contents of the disc information are repeatedly recorded in each front head cluster of the remainder of the fragments.

Information representing the corresponding recording layer, information representing recording velocity, and write strategy information corresponding to the recording velocity are included in each disc information. Such information is utilized in recording and reproducing the optical disc, to provide optimal recording power per recording layer and per recording velocity.

The disc information of the present invention is characterized in providing specific recording velocity information supported by the disc and associated write strategy information, and more specifically, in providing specific recording velocity supported for each recording layer and associated write strategy information via a specified method for discs having a plurality of recording layers.

The specific configuration of the disc information is for a Blu-ray disc, which may differ from the configuration of a DVD-based disc. Specifically, the recording DI volume for a Blu-ray disc is 112 bytes or equivalent. By configuring the disc information of the same recording layer as one information, i.e., without repeating any common information, the write strategy configuration may differ per recording velocity.

FIGS. 4A to 4D are diagrams of recording disc information according to a first of four embodiments of the present invention, in which applicable writing speed information is recorded.

To acquire disc information associated with a specific writing speed of an intended specific recording layer from a plurality of existing disc information, all the disc information should be read, which is time consuming. For instance, if there are four recording layers and eight writing speeds applicable per recording layer, a total of 32 disc information are needed. A recorder/reproducer (FIG. 8) should search all 32 disc information whenever a value of the disc information for the specific recording layer and writing speed is needed. Hence, the present invention is characterized in including disc-applicable writing speed information and a disc's recording layer information (number of layers) in the disc information, to enable a disc information search by a specified method using the recorded information. This information, which determines the sequence of a plurality of disc information, is commonly included (copied) in each disc information, thereby facilitating the access of the disc information for a specific recording layer and writing speed.

Moreover, one write strategy (WS) is recorded within each disc information and identification information for identifying a kind of the corresponding write strategy (WS) is separately recorded, whereby a record playback apparatus (FIG. 8) is facilitated to use the write strategy (WS). Moreover, by selecting to record one write strategy (WS) for a specific writing speed and a specific recording layer in disc information, a disc manufacturer can be provided with convenience.

Figure 4A:
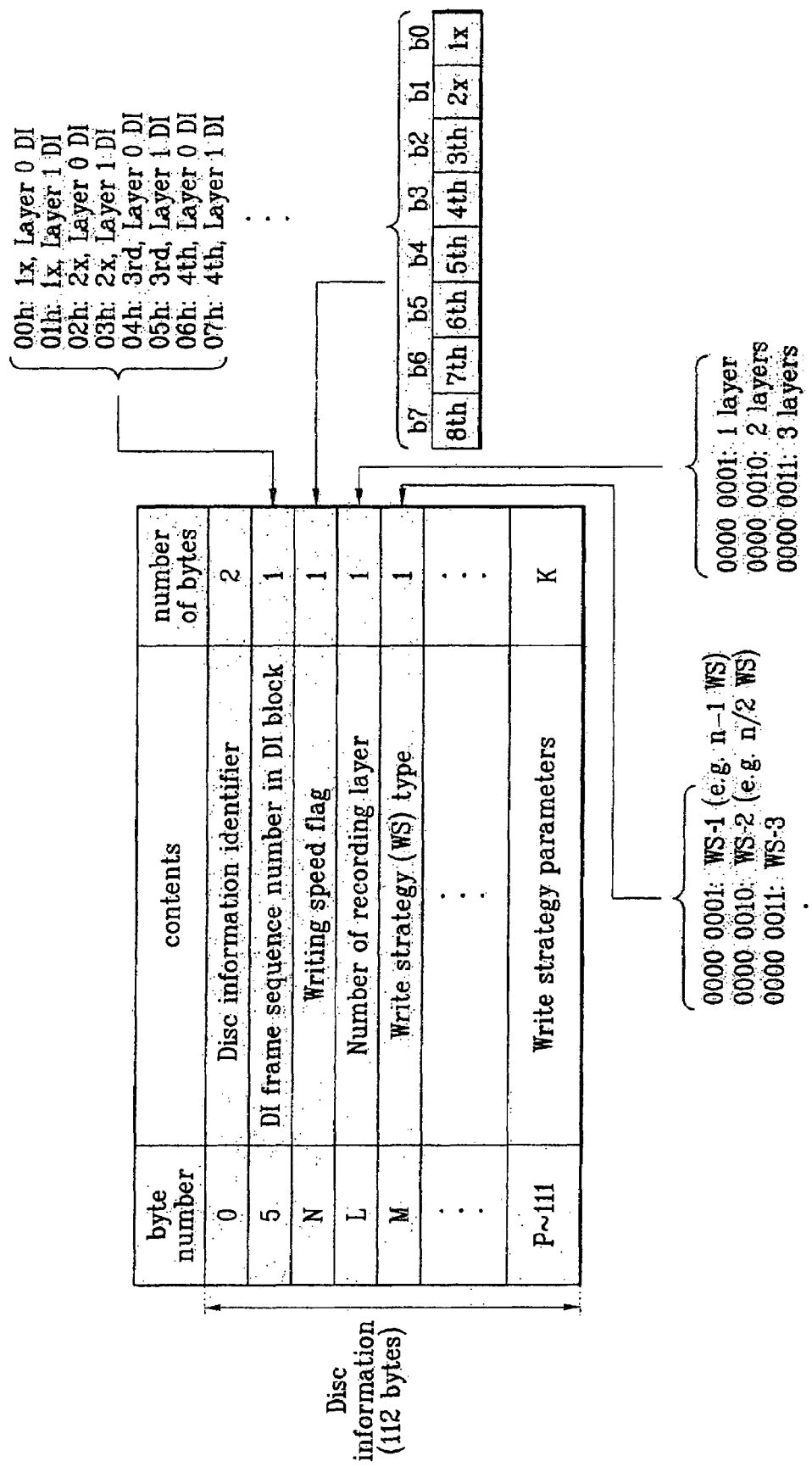
FIGS. 4A to 4D are diagrams of disc information recorded according to a first embodiment of the present invention.

Referring to FIG. 4A, illustrating a disc information structure, each disc information sequence is determined by a sequence number and is recorded using one byte. For instance, the information is recorded in a fifth byte (i.e., the "DI frame sequence number in DI block," which can be represented as 00h, 01h, 02h, 03h, 04h, 05h, 06h, or 07h) of the disc information, where a fifth byte of 00h or 07h indicates a first or eighth disc information, respectively. A meaning of the sequence of the $5^{th}$ byte will be decided by $N^{th}$ and $L^{th}$ bytes that will be explained later.

Writing speed information applicable by a corresponding disc is recorded in a specific area ($N^{th}$ byte) within disc information which is named 'Writing speed flag' field. For instance, whether a specific writing speed of eight kinds of writing speeds is applicable by the corresponding disc is represented by 1-bit each in the same area having 1-byte allocated thereto. Namely, it can be defined that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating applicability of a specific writing speed.

For instance, if 1× speed is applicable by a corresponding disc only, '0000 0001' is written in $N^{th}$ byte. If all of the eight kinds of writing speeds are applicable, '1111 1111' is written in the $N^{th}$ byte.

In the above explanation, 1× and 2× speeds utilized by every disc almost are previously decided to be adopted. Yet, writing speeds decided by specification can be used as the remaining writing speeds from $3^{rd}$ writing speed. For instance, the $3^{rd}$, $4^{th}$, $5^{th}$, $6^{th}$, $7^{th}$, and $8^{th}$ writing speeds may be set to 5×, 6×, 8×, 12×, 14×, and 16× speeds, respectively.

According to the present invention, an allowable writing speed is represented by a bit having a value of "1," and each bit having a value of "0" represents an excluded writing speed. Hence, there can be no case of a lower bit being set to zero while an upper bit is set to one. For example, a disc allowing writing speeds up to the fourth writing speed has writing speed flag of 0000 1111b, and a writing speed flag of, say, 0000 1011b, is barred.

For another example, bits can be independently set. Even if upper bits are set to '1b', it is able to set lower bits to '0b'. In case that a lower writing speed has to be applicable if a maximum writing speed is applicable, write parameters according to the corresponding writing speed should be written altogether. Hence, it may become a considerable load put on an information recording. By rendering a portion of the lower writing speed inapplicable even if the maximum writing speed is applicable, it is able to reduce the corresponding information amount. Furthermore, be using one specific writing parameter, at least two recording speeds can be possible.

Meanwhile, recording layer information indicating the number of recording layer(s) existing within the corresponding disc is recorded in another specific area ($L^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer in FIG. 1, '0000 0001' is written in the $L^{th}$ byte. In case that the recording layer is the dual layer in FIG. 2, '0000 0010' is written in the $L^{th}$ byte. In case that four recording layers exist, '0000 0100' is written in the $L^{th}$ byte.

Since limitation is put on the number of the currently considered recording layer(s), which is currently two recording layers, 4-bits within the $L^{th}$ byte are enough to represent total fifteen recording layers (in case of '1111'). In such a case, it is apparent that other valid information can be written in the remaining area (4-bits) of the $L^{th}$ byte.

Moreover, identification information for identifying a kind of write strategy (WS) recorded in $P^{th}$~$111^{th}$ bytes is written in another specific area ($M^{th}$ byte) within the disc information, which is named 'Write Strategy (WS) Type' field.

Namely, in the disc information of the present invention, one write strategy (WS) is recorded for a specific writing speed and a specific recording layer and the write strategy is optionally selected from various kinds of specified types by a disc manufacturer. Hence, if the corresponding disc information is a first type write strategy WS-1, '0000 0001' is written in the $M^{th}$ byte. If the corresponding disc information is a second type write strategy WS-2, '0000 0010' is written in the $M^{th}$ byte. Substantial write strategy (WS) is recorded in $P^{th}$~$111^{th}$ bytes. Yet, the substantial write strategy (WS) will be recoded as a value interoperating with the decided write strategy (WS) type in the $M^{th}$ byte. The write strategy (WS) type via the $M^{th}$ byte is optionally recordable in every disc information. It is also possible to apply one specified write strategy (WS) type in basic speed(1× speed) disc information, which is expected to be supported by every record playback apparatus (FIG. 8), in a mandatory manner.

In addition to a method of recording specific parameters of the write strategy (WS), a medium property of a recording layer is generally modified by applying a laser beam to the recording layer within an optical disc via a pickup ('11' in FIG. 8) to perform a recording thereof. Hence, it should be decided an intensity (recording power) of the laser beam, a time of applying the recording power thereto, and the like. The above-decided various kinds of write strategies are named 'Write Strategy (WS)' in general and specific contents recorded within a specific 'Write Strategy (WS)' are named 'Write Strategy (WS) parameters'.

The write strategy (WS) can be recorded in various ways. As a disc becomes highly densified and has higher speed, a writing speed, i.e., disc RPM) as well as the medium property of the recording layer is considerably affected. Hence, a more accurate system is requested. The various write strategies (WS) are explained as follows for example.

First of all, there is a system having a recording pulse smaller by 1 than a recording mark size (n) formed on a recording layer medium, which may be called '(n−1) WS'. Secondly, there is a system having a recording pulse having a size amounting to a half of the recording mark size (n), which may be called 'n/2 WS'. New write strategies (WS) keep being developed. Regarding the different kinds of write strategy (WS), when there exist the various systems of the write strategy (WS) exist as parameters applied to the write strategies (WS) differ from each other, a disc manufacturer tests the recording power according to the write strategy (WS) to be recorded in the selected $M^{th}$ byte and then records a result of the test as write strategy (WS) in the Pth~$111^{th}$ bytes within the disc information.

From the above-recorded 'writing speed information' of the $N^{th}$ byte and the 'recording layer information' of the $L^{th}$ byte, the record/playback apparatus (FIG. 8) recognizes how many disc information exist within the corresponding disc. Namely, the number of the existing disc information is found by multiplying an applicable writing speed number by the number of recording layers. As the present invention applies one write strategy (WS) for a specific writing speed and a specific recording layer, the kind and number of the write strategy (WS) may not be taken into consideration in deciding the number of disc information.

The above-decided information about the number of total disc information can be recorded in a specific area (e.g., $4^{th}$ byte or the like) (not shown in the drawing) within the disc information as well.

Hence, it is able to program a plurality of the above-decided disc information that the sequence is decided by the sequence numbers, which is written in the $5^{th}$ byte in the foregoing description, and that each of the disc information designates the previously decided writing speed and recording layer by the sequence.

For example, by knowing that four writing speeds applicable by a disc exist if the $N^{th}$ byte is '0000 1111' and that two recording layers exist within the disc if the $L^{th}$ byte is '0000 0010', total eight disc information are needed so that the sequence will be '00h~07h'. It is previously decided that disc information of '00h', '01h', '02h', '03h', '04h', '05h', '06h', and '07h' relate to '1× speed, $1^{st}$ recording layer (L0)', '2× speed, $2^{nd}$ recording layer (L1)', '2× speed, $1^{st}$ recording layer (L0)', '2× speed, $2^{nd}$ recording layer (L1)', '$3^{rd}$ writing speed, $1^{st}$ recording layer (L0)', '$3^{rd}$ writing speed, $2^{nd}$ recording layer (L1)', '$4^{th}$ writing speed, $2^{nd}$ recording layer (L1)', and '$4^{th}$ writing speed, $2^{nd}$ recording layer (L1)', respectively.

In the above-explained example, the writing speed is preferentially taken into consideration. Yet, it is apparent that the recording layer can be preferentially taken into consideration. Namely, it can be defined in the sequence of '$1^{st}$ recording layer (L0), 1× speed', '$1^{st}$ recording layer (L0), 2× speed', and the like Hence, in order to acquire the disc information for a specific target writing speed and a specific target recording layer, the record playback apparatus (FIG. 8) is facilitated to check which disc information is related to the specific target writing speed and recording layer from 'writing speed information' of the $N^{th}$ byte and 'recording layer information' of the $L^{th}$ byte commonly recorded within the respective disc information instead of playing back to check the entire disc information.

Figure 4B:
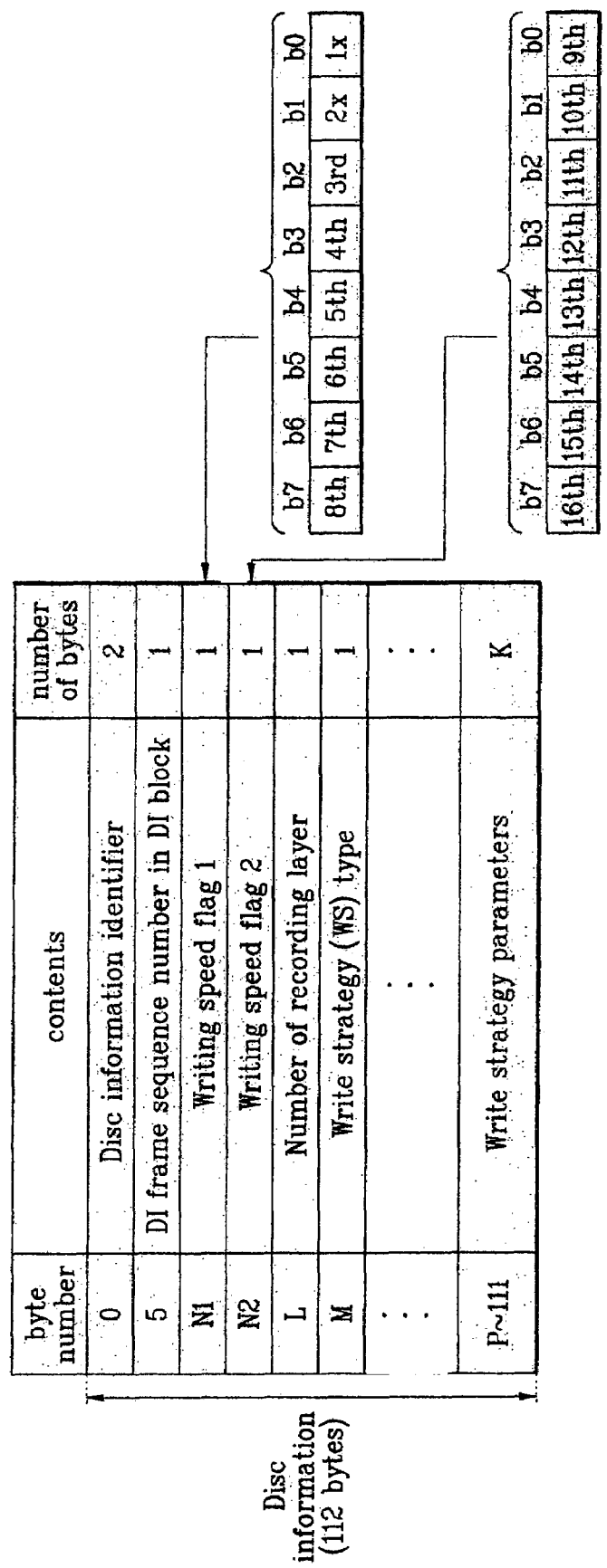

FIG. 4B shows an example of extending the first embodiment of the present invention in FIG. 4A. In case that writing speeds applicable by a disc exceed eight kinds, $N^{th}$ byte ('Writing speed flag' field) in FIG. 4A is extended to indicate presence or non-presence of applicability of $1^{st}$ to $8^{th}$ writing speeds by a flag in N1$^{th}$ byte ('Writing speed flag 1' field), and another byte is allocated to display presence or non-presence of applicability of $9^{th}$~$16^{th}$ writing speeds by a flag in N2$^{th}$ byte. Contents written in the remaining bytes are equivalent to those of the first embodiment of the present invention in FIG. 4A.

Figure 4C:
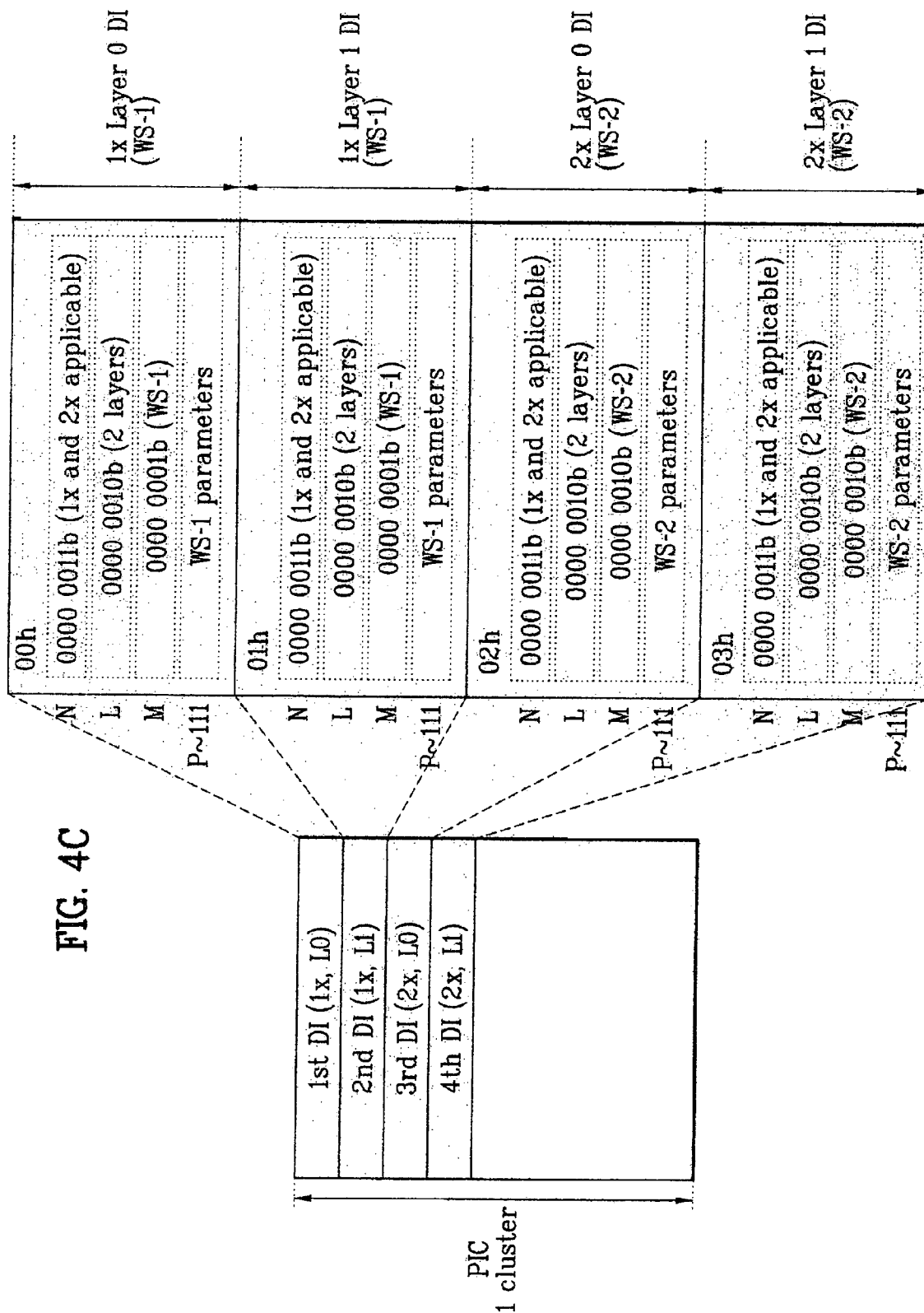

FIG. 4C shows an example of recording disc information by the first embodiment of the present invention in FIG. 4A. It can be known that there are two applicable writing speeds (1× and 2×) from $N^{th}$ byte ('0000 0010b') commonly recorded in the entire disc information and that two recording layers exist within a disc from $L^{th}$ byte ('0000 0010b').

Hence, in the example of FIG. 4C, total four disc information (two recording layers multiplied by two writing speeds) exist and a sequence of the disc information becomes '00h' (1X,L0)→'01h' (1X,L1)→'02h'(2X,L0)→'03h' (2X,L1). This is a specified content according to a predetermined sequence and, as mentioned in the foregoing description, can be rendered into a different sequence by a specification.

An intrinsic write strategy (WS) is recorded in other bytes within each disc information as well as $N^{th}$ and $L^{th}$ bytes. Specifically, information of a type of a write strategy (WS) written in P$^{th}$~111$^{th}$ bytes within the corresponding disc information is recorded in M$^{th}$ byte. Namely, information in the M$^{th}$ byte can be different from that in the P$^{th}$~111$^{th}$ bytes.

In the example in FIG. 4C, '00h' (1×-speed, L0) and '01h' (1×-speed, L1) relate to the application of a first type write strategy (WS-1) and '02h' (2×-speed, L0) and '03h' (2×-speed, L1) relate to the application of a second type write strategy (WS-2).

Figure 4D:
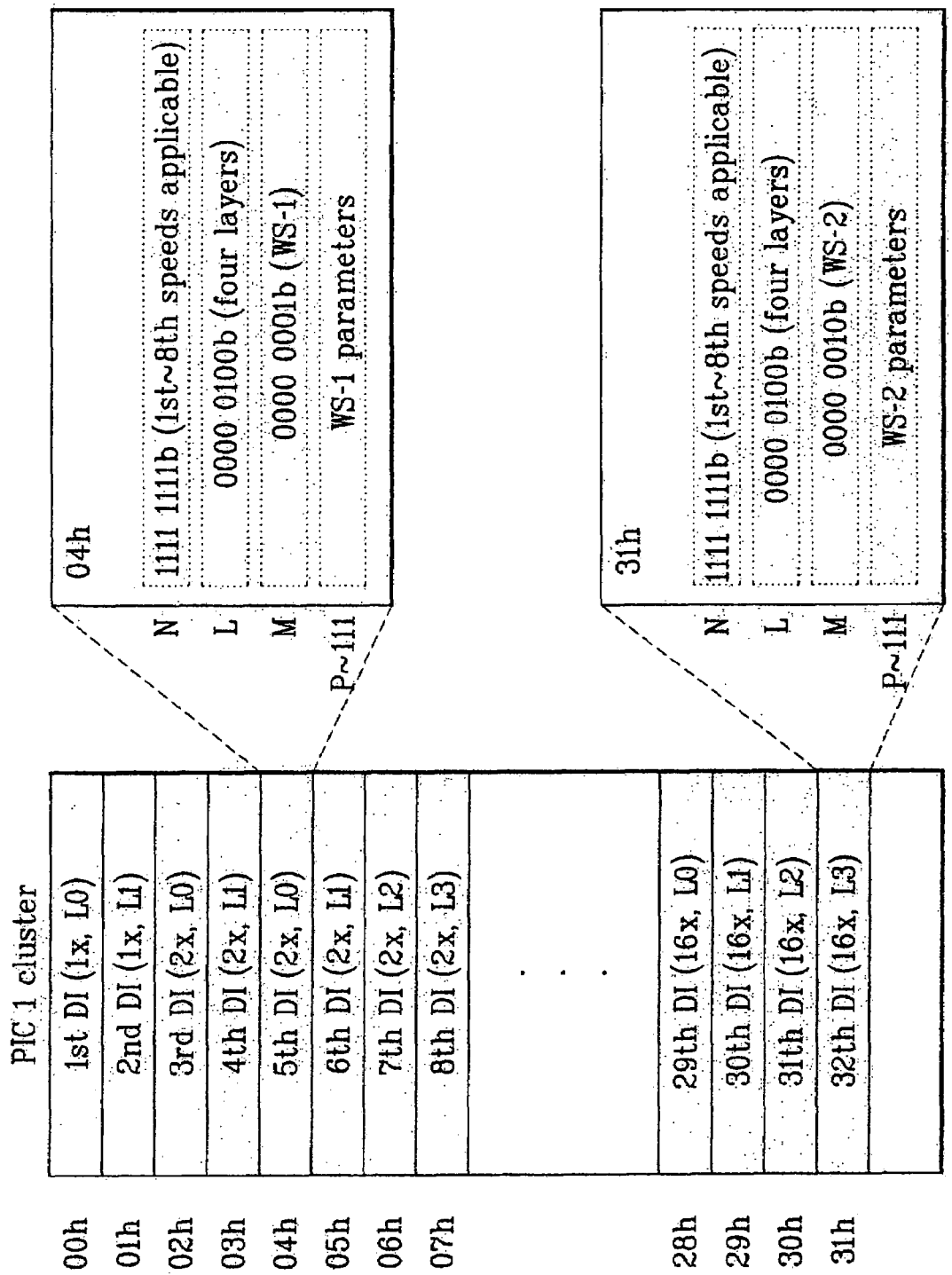

FIG. 4D shows another example of recording disc information by the first embodiment of the present invention in FIG. 4A. It can be known that there are eight applicable writing speeds (1× through 8×) from N$^{th}$ byte ('1111 1111b') commonly recorded in the entire disc information and that four recording layers exist within a disc from L$^{th}$ byte ('0000 0100b'). Hence, in the another example of FIG. 4D, total thirty-two disc information (four recording layers multiplied by eight writing speeds) exist and a sequence of the disc information becomes '00h' (1X,L0)→'01h' (1X,L1)→'02h' (1X,L2)→'03h'(1X,L4)→'04h'(2X,L0)→...→'31h'(16X, L4).

An intrinsic write strategy (WS) is recorded in other bytes within each disc information as well as $N^{th}$ and $L^{th}$ bytes. Specifically, information of a type of a write strategy (WS) written in P$^{th}$~111$^{th}$ bytes within the corresponding disc information is recorded in M$^{th}$ byte. Namely, information in the M$^{th}$ byte can be different from that in the P$^{th}$~111$^{th}$ bytes.

In the another example of FIG. 4D, if a record playback unit (FIG. 8) intends to search disc information related to 2×-speed of a first recording layer to perform recording by applying a write strategy (WS) within the corresponding disc information, it can be known from the information in the $N^{th}$ and $L^{th}$ bytes commonly recorded in the entire disc information that total thirty-two disc information (four recording layers multiplied by eight writing speeds) exist in the corresponding disc according to the sequence of the disc information, namely, '00h' (1×-speed, L0) through '31h' (16×-speed, L4). Hence, the record playback apparatus (FIG. 8) enables to recognize that the disc information related to the 2×-speed of the first recording layer to be searched is '04h' and that the corresponding disc information ('04h') is recorded as the first type write strategy (WS-1) from the write strategy (WS) type identification information ('0000 0002b') recorded in the M$^{th}$ byte within the corresponding information ('04h'), thereby reading out parameter values of the first type write strategy (WS-1) via the P$^{th}$~111$^{th}$ bytes to utilize in the recording.

Likewise, if intending to search disc information related to 16×-speed of a fourth recording layer to perform recording by applying a write strategy (WS) within the corresponding disc information, the record playback unit (FIG. 8) recognizes that the corresponding disc information is '31h' via the same process and that the write strategy type (WS) is the second type (WS-2), thereby enabling to utilize them in the recording.

Therefore, if a host or a control unit ('20' in FIG. 8) requires the recording in a specific recording layer at a specific writing speed, the record playback apparatus (FIG. 8) is facilitated to search the corresponding information, thereby enabling to confirm the write strategy (WS) recorded within the corresponding disc information.

Figure 5A:
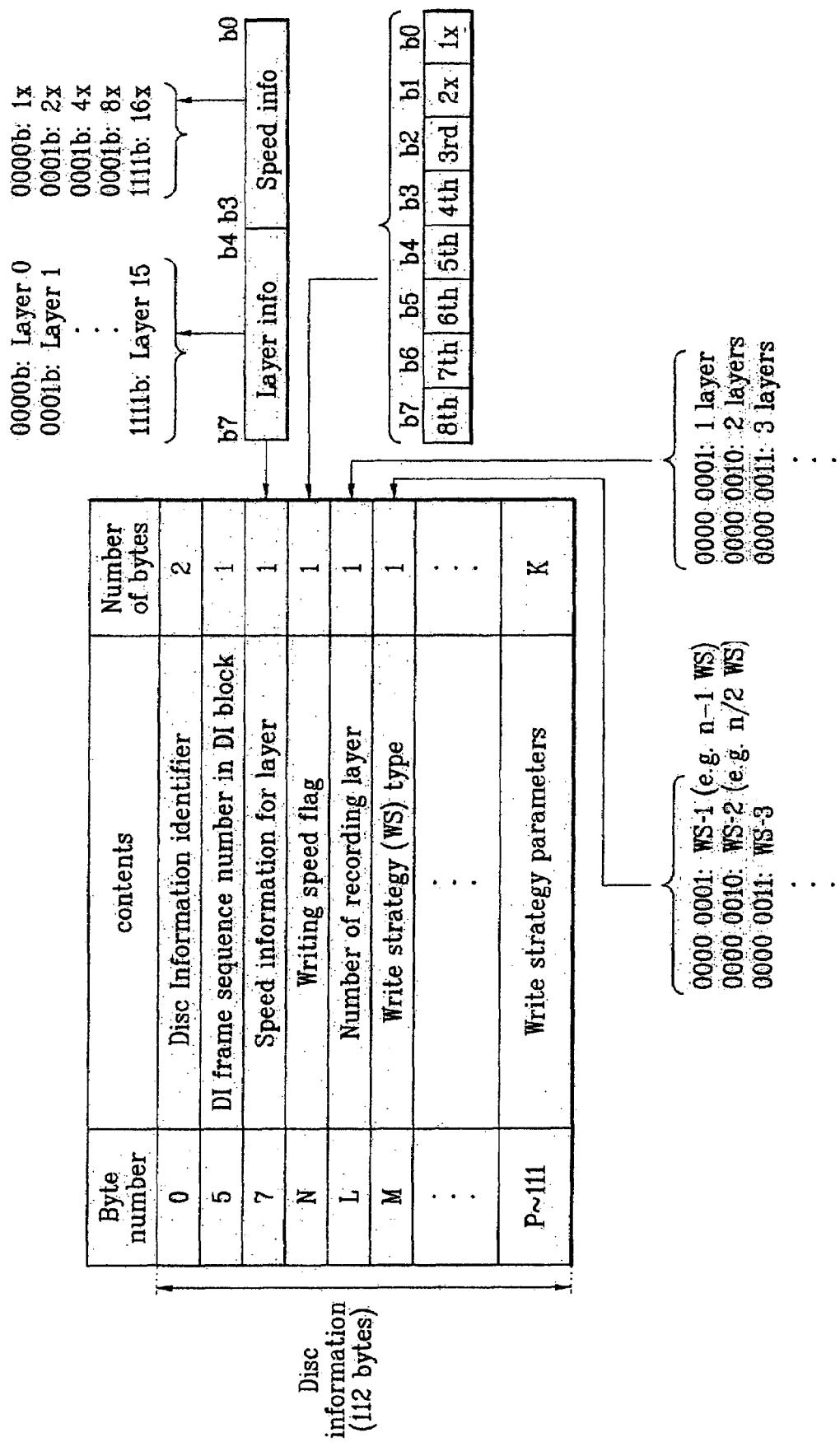
FIGS. 5A to 5B are diagrams of disc information recorded according to a second embodiment of the present invention.

FIG. 5A shows a method of recording disc information according to a second embodiment of the present invention. In order to search disc information related to a specific writing speed and recording layer like the first embodiment of the present invention in FIG. 4A, writing speed information ('writing speed flag' field) applicable by a disc is recorded in $N^{th}$ byte and recording layer information ('Number of Recording Layer' field) existing within the disc is recorded in $L^{th}$ byte. A second embodiment according to the present invention is characterized in that intrinsic recording layer information and writing speed information of the corresponding disc information are additionally recorded in a corresponding specific area (7$^{th}$ byte).

Figure 8:
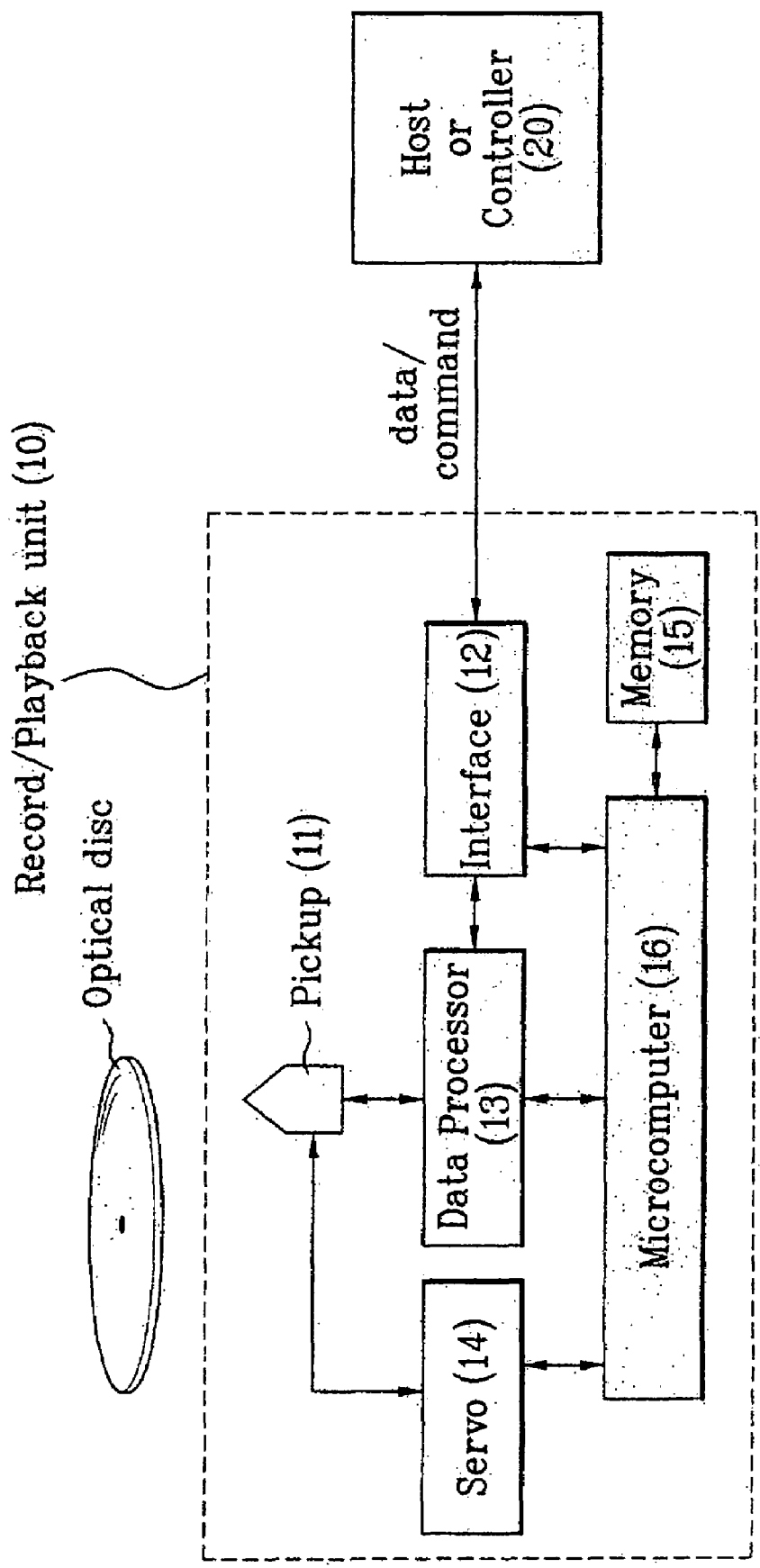
FIG. 8 is a block diagram of an optical disc recording and reproducing apparatus using disc control information according to the present invention.

Namely, in the same manner of the first embodiment of the present invention in FIG. 4A, after the disc information for the specific writing speed and recording layer has been searched, the recording layer information and the writing speed information corresponding to each disc information are directly recorded in each disc information to confirm (verify) whether the search disc information is related to the requested specific writing speed and recording layer. This is necessary for coping with error detection of the disc information since the disc information is very important for recording and management of the disc. Moreover, if the intrinsic writing speed and recording layer information are directly recorded in the disc information each, the method of searching the disc information quickly like in the first embodiment of the present invention can be programmed as well as the method of searching the disc information using the $7^{th}$ byte only according to the second embodiment of the present invention in aspect of designing the record playback apparatus (FIG. 8). Hence, it is advantageous in that a degree of freedom can be given to the design thereof.

In the second embodiment (FIG. 5A), the $N^{th}$, $L^{th}$, $M^{th}$, and $P$~$111^{th}$ bytes have the same content as described in the first embodiment (FIG. 4A). The characterizing $7^{th}$ byte ('Speed information for Layer' field) is divided into upper 4-bits b0~b3 where writing speed information (speed info) is recored and lower 4-bits b4~b7 where recording layer information (Layer info) is recorded. Unlike the information recorded in the $N^{th}$ and $L^{th}$ bytes, the writing speed information and the recording layer information mean an intrinsic value of the corresponding disc information.

For instance, in order for the upper 4-bits b0~b3 of the $7^{th}$ byte to represent maximum 16× speed, it is defined that '0000b', '0001b', and '1111b' mean 1×-speed, 2×-speed, and 16×-speed, respectively. The lower 4-bits of the $7^{th}$ byte is rendered to directly display a value of the recording layer. It is defined that '0000b', '0001b', and '1111b' mean $1^{st}$ recording layer L0, $2^{nd}$ recording layer L1, and $16^{th}$ recording layer L15, respectively.

Hence, if the corresponding disc information is the 2×-speed associated information of the second recording layer, the $7^{th}$ byte becomes '0001(L1) 0001(2×)'.

Figure 5B:
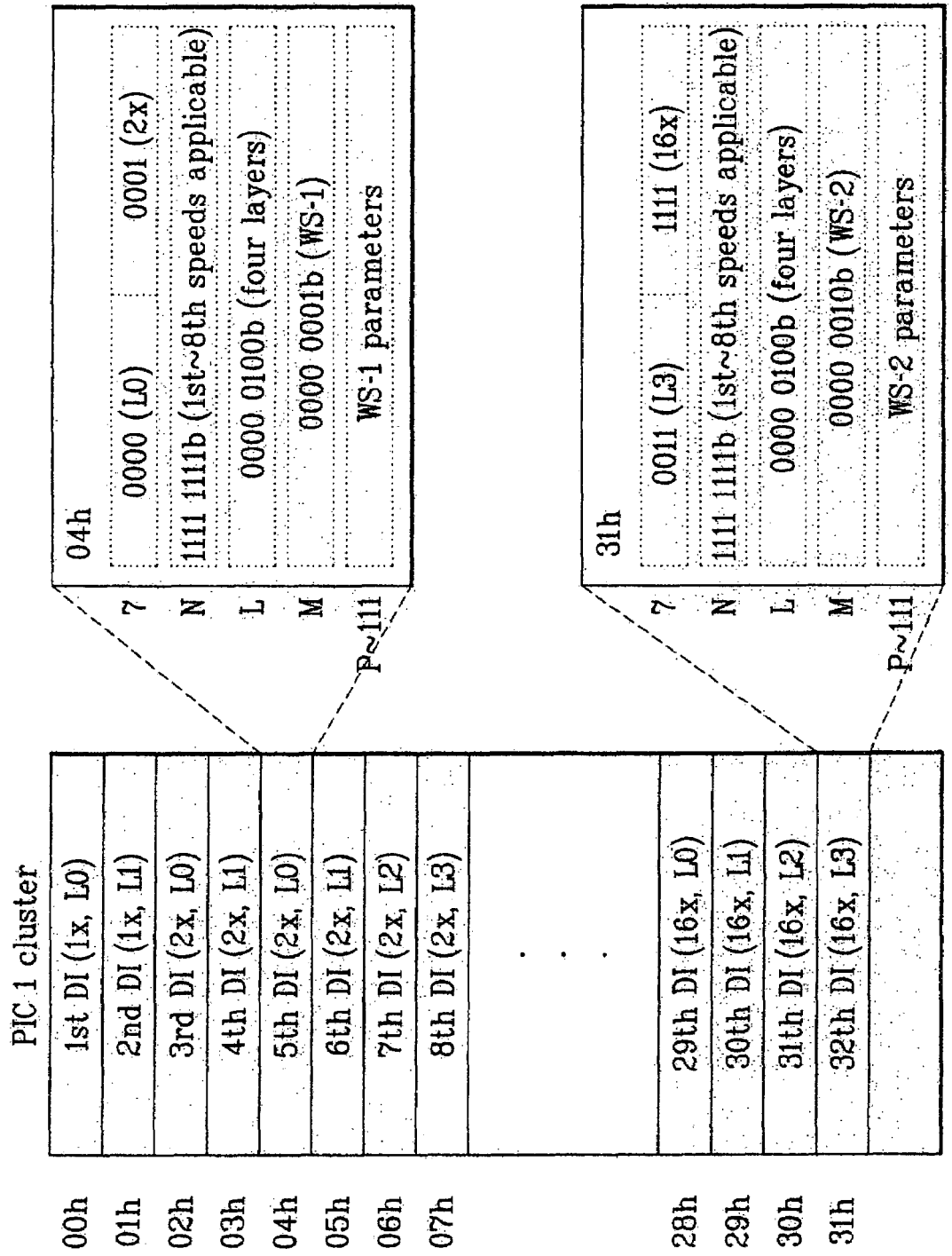

FIG. 5B shows an example of recording disc information according to the second embodiment of the present invention in FIG. 5A, in which total thirty-two disc information exist by four recording layers and eight writing speeds.

FIG. 5B is different from FIG. 4D in that the $7^{th}$ byte within each of the disc information possesses the intrinsic writing speed information and recording layer values of the corresponding disc information but is equivalent to FIG. 4B in that the remaining portions (field) within the disc information are equal to those in FIG. 4D.

Hence, the 2×-speed associated disc information of the $1^{st}$ recording layer enables to inform that the disc information of '04h' corresponds to it using the $N^{th}$ and $L^{th}$ bytes like the example of FIG. 4D. Yet, in FIG. 5B, it is confirmed (verified) that the corresponding disc information ('04h') coincides with the disc information for the requested specific writing speed and recording layer from '0000(L0) 0001(2×)' written in the $7^{th}$ byte within the corresponding disc information ('04h').

Figure 6B:
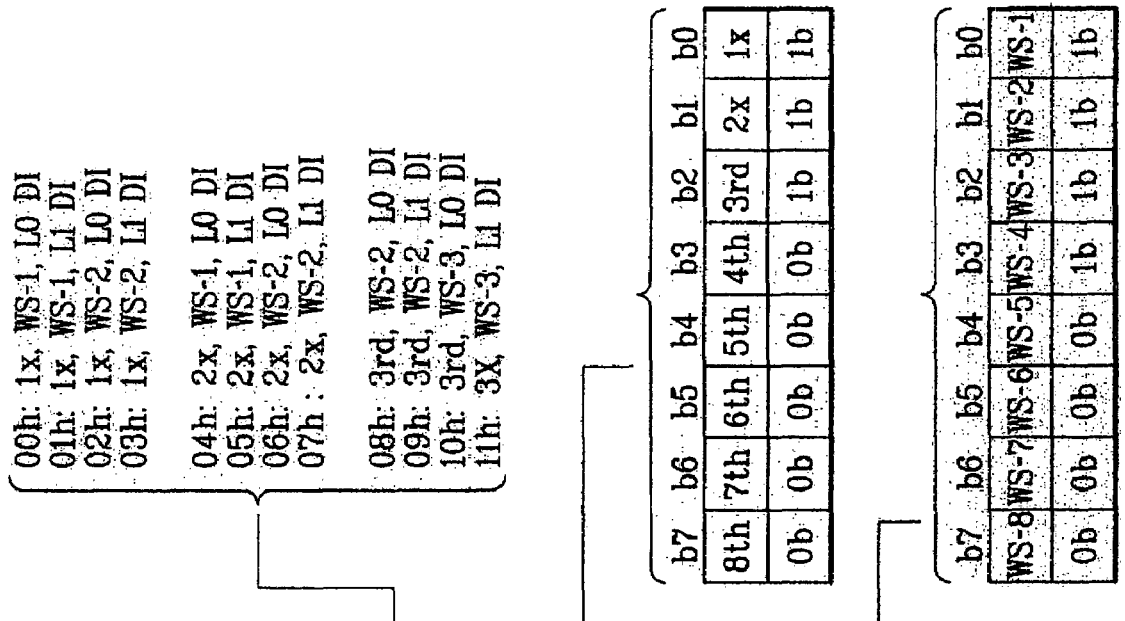
Figure 6C:
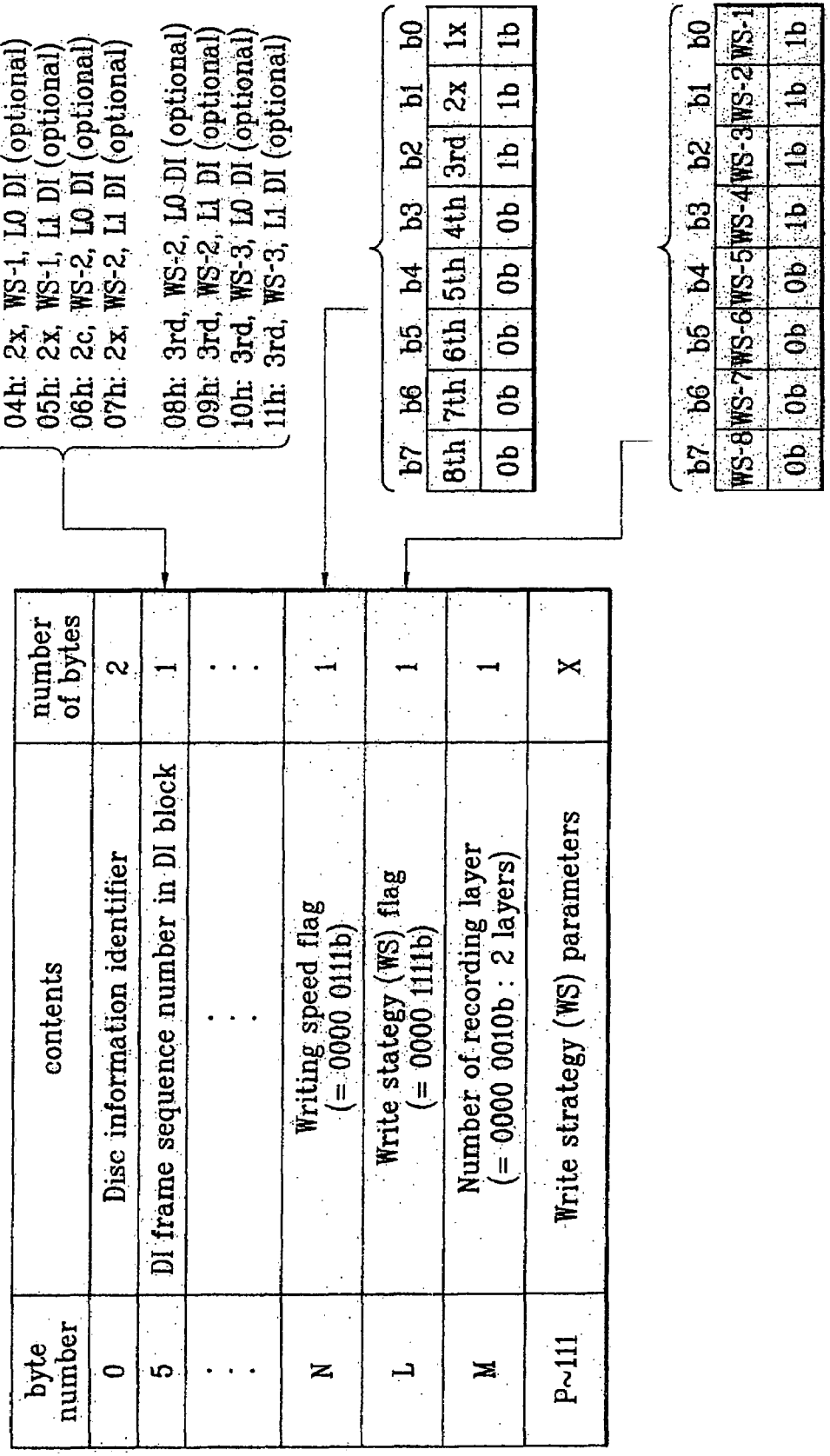

FIGS. 6A to 6C are diagrams of recording disc information according to a third embodiment of the present invention, in which a disc manufacturer enables to optionally record a specific one among a plurality of write strategy (WS) kinds to secure disc manufacturer's convenience and to enable an efficient recording of disc information.

Specifically, a third embodiment according to the present invention is characterized in that, in recording various kinds of write strategies (WS) within disc information, the write strategy (WS) kinds amounting to a per writing speed specific number (e.g., m, where m<n) among the various kinds (e.g., n-kinds) of the write strategies (WS) specified for disc manufacturer's (or disc information writer's) convenience are optionally recordable only and that, for convenience of a manufacturer developing an optical record playback apparatus (FIG. 8) performing an optical recording using the above-recorded disc information, information indicating which is an optimal write strategy (WS) among a plurality (m) of write strategies (WS) recorded within the disc information is recorded within the disc information.

A method of recording disc information according to a third embodiment of the present invention is explained by referring to FIGS. 6A to 6C as follows.

FIG. 6A schematically shows fields recorded within disc information.

Referring to FIG. 4A, a sequence for disc information each is decided by a sequence number and is recorded by 1-byte. For instance, the information is recorded in a $5^{th}$ byte within disc information, is named 'DI frame sequence number in DI block', and is briefly represented by '00h, 01h, 02h, . . . '. Namely, if the information of the $5^{th}$ byte is '00h', it means $1^{st}$ disc information. If the information of the $5^{th}$ byte is '07h', it means $8^{th}$ disc information.

Writing speed information applicable by a corresponding disc is recorded in a specific area ($N^{th}$ byte) within disc information, which is named 'Writing speed flag' field. For instance, whether a specific writing speed of eight kinds of writing speeds is applicable by the corresponding disc is represented by 1-bit each in the same area having 1-byte allocated thereto. Namely, it can be defmed that the corresponding writing speed is not applicable (supported) if a bit value is '0b' in entire bits or that the corresponding writing speed is applicable (supported) if the bit value is '1b'. Hence, each of the bits b0~b7 within 1-byte becomes flag information indicating applicability of a specific writing speed. For instance, if 1× speed is applicable by a corresponding disc only, '0000 0001b' is written in $N^{th}$ byte. If all of the eight kinds of writing speeds are applicable, '1111 1111b' is written in the $N^{th}$ byte.

In the above explanation, 1× speed (1×) and 2× speed (2×) utilized by every disc almost are previously decided to be adopted. Yet, writing speeds decided by specification can be used as the rest writing speeds from $3^{rd}$ writing speed. For instance, it is possible to set $3^{rd}$, $4^{th}$, $5^{th}$, $6^{th}$, $7^{th}$, and $8^{th}$ writing speeds ($3^{rd}$ ×, $4^{th}$ ×, $5^{th}$ ×, $6^{th}$ ×, $7^{th}$ ×, $8^{th}$ ×) to 5×, 6×, 8×, 12×, 14×, and 16× speeds, respectively.

And, information of informing a kind of write strategy (WS) applicable by a specification of a corresponding disc is recorded in another specific area ($L^{th}$ byte) within the disc information, which is named 'Write Strategy (WS) flag' field. For instance, whether a specific write strategy (WS) of eight kinds of write strategies (WS) is applicable by the corresponding disc is represented by 1-bit each in the same area having 1-byte allocated thereto.

Namely, it can be defined that the corresponding write strategy (WS) is not applicable (supported) if a bit value is '0b' in entire bits or that the corresponding write strategy (WS) is applicable (supported) if the bit value is '1b'. Hence, each of the bits b0~b7 within 1-byte becomes flag information indicating applicability of a specific write strategy (WS). For instance, if $1^{st}$ to $3^{rd}$ type write strategies (WS1 to WS3) are applicable by a corresponding disc only, '0000 0001b' is written in $L^{th}$ byte. If all of the eight types of write strategies (WS1 to WS8) are applicable, '1111 1111b' is written in the $L^{th}$ byte.

In doing so, a setup state of lower bits is not decided according to a setup state of upper bits. Instead, the lower bits are independently set, respectively. For instance, if the $1^{st}$ and $3^{rd}$ type write strategies WS1 and WS3 are applicable but the $2^{nd}$ type write strategy WS2 is inapplicable, the $L^{th}$ byte will be set to '0000 0101b'.

Meanwhile, recording layer information indicating the number of recording layer(s) existing within the corresponding disc is recorded in another specific area ($M^{th}$ byte) within the disc information, which is named 'Number of Recording Layer' field. For instance, a value meaning the number of the recording layer(s) can be represented by a binary number in the same area having 1-byte allocated thereto. In case that the recording layer is the single layer (one recoding layer) in FIG. 1, '0000 0001b' is written in the $M^{th}$ byte. In case that the recording layer is the dual layer (two recording layers) in FIG. 2, '0000 0010b' is written in the $M^{th}$ byte. In case that four recording layers exist, '0000 0100b' is written in the $M^{th}$ byte.

And, parameters of a selected write strategy (WS) are written in another specific area ($P^{th}$~$111^{th}$ bytes) within the disc information, which is named 'Write Strategy (WS) parameters' field.

By writing the $N^{th}$, $L^{th}$, and $M^{th}$ byte information recorded within the disc information by the same values in common to the entire disc information, respectively, the record playback apparatus (FIG. 8) is facilitated to acquire the information of the writing speed applicable by the corresponding disc, the write strategy (WS) kind, and the number of the recording layers despite playing back any disc information. And, from the acquired information, the record playback apparatus (FIG. 8) enables to decide a sequence of the disc information recorded within the disc, the writing speed and recording layer meant by the sequence, and the corresponding write strategy (WS) kind or type.

FIG. 6B shows an example of recording disc information according to the third embodiment of the present invention in FIG. 6A, in which three kinds of writing speeds are applicable so that $N^{th}$ byte becomes '0000 0111b', in which four kinds of write strategies (WS) are applicable so that $L^{th}$ byte becomes '0000 1111b', and in which two recording layers exist within a disc so that $M^{th}$ byte becomes '0000 0010b'.

Hence, it may be able to record disc information per writing speed, per recording layer, and per write strategy (WS) type. Yet, in such a case, the number of the recorded disc information excessively increases. Moreover, a disc manufacturer should test the entire write strategy (WS) types and record the test results within the disc information, whereby it becomes a burden.

Therefore, in the third embodiment according to the present invention, write strategies (WS) of which number (m) is smaller than that (n) of the maximum applicable write strategy types are recordable within disc information and a disc manufacturer further enables to optionally record a specific one of a plurality of write strategies (WS), whereby disc manufacturer's convenience is secured as well as an efficient recording of disc information is enabled.

FIG. 6B shows a recording example using $1^{st}$ and $2^{nd}$ type write strategies WS1 and WS2 for 1× speed (1×), $1^{st}$ and $2^{nd}$ type write strategies WS1 and WS2 for 2× speed (2×), and $2^{nd}$ and $3^{rd}$ type write strategies WS2 and WS3 for $3^{rd}$ writing speed ($3^{rd}$ ×).

Namely, it is able to record disc information using write strategy (WS) types (kinds) of which number (two) is smaller than that (four) of the entire applicable write strategy (WS) types (kinds).

Specifically, regardless of the number of the applicable write strategy WS) types, a disc manufacturer preferably selects two of the applicable write strategy (WS) types to perform recording per writing speed. Thus, a degree of freedom of optional recording is secured for the disc manufacturer as well as the number of disc information recorded within a disc can be appropriately adjusted.

FIG. 6C shows another example of recording disc information according to the third embodiment of the present invention in FIG. 6A. Like FIG. 6B, there are three kinds of applicable writing speeds and $N^{th}$ byte is set to '0000 0111b'. There are four applicable write strategy (WS) types and $L^{th}$ byte is set to '0000 0111b'. There are two recording layers existing within a disc and $M^{th}$ byte is set to '0000 0010b'.

Specifically, in FIG. 6C, a specific write strategy (WS) is recorded in a mandatory manner in case of 1× speed (1×) or the write strategy (WS) can be recorded in an optional manner in case of the rest writing speeds.

Namely, in case of recording two kinds of write strategy (WS) types per writing speed, $1^{st}$ type write strategy WS1 is preferentially recorded in a mandatory manner in case of 1× speed (1×) and one of $2^{nd}$ to $4^{th}$ type write strategies WS2 to WS4 is optionally selected to be recorded. In FIG. 6C, the $2^{nd}$ type write strategy WS2 is selected to be recorded.

Moreover, in 2× speed (2×) or $3^{rd}$ writing speed ($3^{rd}$ ×), without the above-explained limitation, two of the four kinds of write strategies WS1 to WS4 are selected to be recorded.

The specific write strategy (WS) is recorded for the 1× speed in a mandatory manner. This is to enable a manufacturer or developer of a record playback apparatus (FIG. 8) to develop low-price products coping with one specific write strategy (WS) only as well as products coping with the entire write strategy (WS) types, thereby facilitating to various kinds of products.

Hence, the writing speed allocating the write strategy (WS) in a mandatory manner can be set to such a higher speed as 2× speed and the like instead of 1× speed in specific specifications. And, it is apparent that the technical idea of the present invention is simply extended to such an application according to the technological development.

Figure 7B:
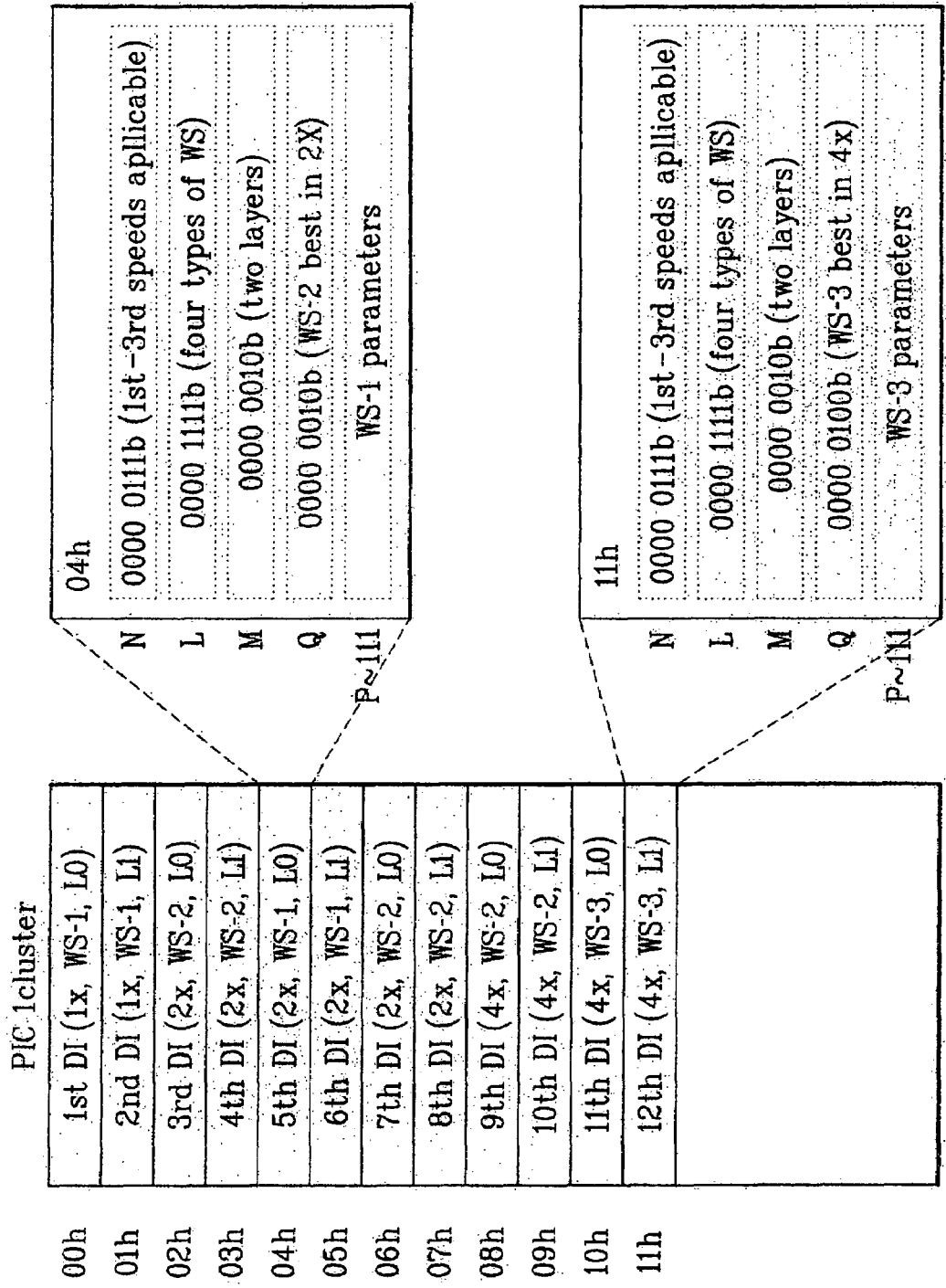

FIG. 7A and FIG. 7B are diagrams of recording disc information according to a fourth embodiment of the present invention, in which disc information structures are schematically shown. The fourth embodiment of the present invention is characterized in that a disc manufacturer records information indicating which is an optimal write strategy (WVS) among a plurality of write strategy (WS) types recorded within disc information within a separate area of the disc information.

Namely, by recording the information indicating the optimal write strategy (WS), a record playback apparatus (FIG. 8) enables to set up an optimal write strategy (WS) type quickly, thereby enabling to efficiently perform a recording by a command of a control unit ('20' in FIG. 8).

FIG. 7A shows a concept of recording disc information according to a fourth embodiment of the present invention, in which $N^{th}$, $L^{th}$, and $M^{th}$ bytes explained in the third embodiment of the present invention mean the same contents and in which information indicating an optimal write strategy (WS) among a plurality of write strategy (WS) types is additionally recorded in $Q^{th}$ byte.

Referring to FIG. 7A, $Q^{th}$ byte of disc information is named 'Best WS flag in writing speed' field and the corresponding byte indicates what is an optimal write strategy (WS) in the writing speed indicated by the disc information.

Namely, bits within the $Q^{th}$ byte indicates write strategy (WS) types in one-to-one correspondence, respectively to mean total eight kinds of the write strategy (WS) types. Specifically, 'b0', 'b1', and 'b7' mean $1^{st}$, $2^{nd}$, and $8^{th}$ type write strategies @S1, @s2, and WS 8, respectively. If a bit value in the entire bits is '1b', the write strategy (WS) of the corresponding type becomes the optimal write strategy (WS) type within the corresponding writing speed.

Namely, one of eight bits within the $Q^{th}$ byte becomes '1b' only, while each of the rest bits will be '0b'. FIG. 7A shows that the $Q^{th}$ byte becomes '0000 0010b' if the $2^{nd}$ type write strategy WS2 becomes the optimal write strategy (WS) of the corresponding writing speed for example. Yet, FIG. 7A exemplarily shows the example of representing the optimal write strategy (WS) only. And, it is apparent that the optimal write strategy (WS) type can be represented in various ways.

FIG. 7B shows an example of recording disc information according to the fourth embodiment of the present invention.

Referring to FIG. 7B, $N^{th}$, $L^{th}$, and $M^{th}$ bytes are areas where the entire disc information record the same values in common. '0000 0111b' in the $N^{th}$ byte means three kinds (e.g., 1×, 2×, and 5×) of writing speeds applicable by a corresponding disc. '0000 1111b' in the $L^{th}$ byte means four kinds of write strategies (WS), which are $1^{st}$ to $4^{th}$ type write strategies WS1 to WS4, applicable by the corresponding disc. And, '0000 0010b' means two recording layers existing within the corresponding disc.

For example, FIG. 7B shows that the $1^{st}$ and $2^{nd}$ type write strategies WS1 and WS2 are selected in the 1× speed, the $1^{st}$ and $2^{nd}$ type write strategies WS1 and WS2 are selected in the 2× speed, and the $2^{nd}$ and $3^{rd}$ type write strategies WS2 and WS3 are selected in the 4× speed.

Moreover, in order to enable a record playback apparatus (FIG. 8) to set up an optimal write strategy (WS) quickly, a disc manufacturer records information indicating a type of the optimal write strategy (WS) of the corresponding writing speed in $Q^{th}$ byte. In FIG. 7B, the $Q^{th}$ byte is set to '0000 0010b' by selecting the $2^{nd}$ type write strategy WS2 as the optimal in the 2× speed or to '0000 0100b' by selecting the $3^{rd}$ type write strategy WS3 as the optimal in the 4× speed.

Hence, each of the $Q^{th}$ bytes within '04h~07h' as the disc information related to the 2× speed will be set to the same '0000 0010b' and each of the $Q^{th}$ bytes within '08h~11h' as the disc information related to the 4× speed will be set to the same '0000 0100b'.

Moreover, $P^{th}$~$111^{th}$ bytes within the disc information are areas for recording the write strategy (WS) meant by the corresponding disc information. Hence, the write strategy (WS) will be recorded in each of the corresponding disc information. In FIG. 7B, '04h' as the $5^{th}$ disc information writes parameters for the $1^{st}$ type write strategy WS1 in the Pth~$111^{th}$ bytes, and '11h' as the $12^{th}$ disc information writes parameters for the $3^{rd}$ type write strategy WS3 in the $P^{th}$~$111^{th}$ bytes.

In summary of the example of FIG. 7B, applicable writing speed information, applicable write strategy (WS) types, and number information of recording layers existing within a disc are recorded in the $N^{th}$, $L^{th}$, and $M^{th}$ bytes, of which values are shared by the entire disc information, within the disc information, respectively. The information indicating the optimal write strategy (WS) type in the corresponding writing speed is recorded by the same value in the $Q^{th}$ byte within the disc information. And, each of the disc information records parameters for intrinsic write strategy (WS) in the $P^{th}$~$111^{th}$ bytes.

FIG. 8 is a block diagram of an optical disc record playback according to the present invention.

Referring to FIG. 8, a recording and/or reproducing apparatus according to the present invention includes a record/playback unit 10 carrying out recording and/or playback on an optical disc and a control unit 20 controlling the record playback unit 10.

The control unit 20 gives a recording or playback command for a specific area, and the record/playback unit 10 caries out the recording/playback for the specific area according to the command of the control unit 20. Specifically, the record/playback unit 10 may include an interface unit 12 performing communications with the host, or an external device, a pickup unit 11 directly recording data on the optical disc or playing back the data, a data processor 13 receiving a playback signal from the pickup unit 11 to restore into a necessary signal value or modulating to deliver a signal to be recorded into a signal to be recorded on the optical disc, a servo unit 14 reading out a signal from the optical disc correctly or controlling the pickup unit 11 to record a signal on the optical disc correctly, a memory 15 temporarily storing disc control information including disc control information, and a microcomputer 16 responsible for controlling the above-described elements within the record playback unit 10. In the above system, it is also possible to control the recording and/or reproducing of data without the control unit 20. In that case, the Microcomputer 16 may control all units in the record/playback unit 10 as performing the function of the control unit 10.

A recording process of an optical disc according to the present invention is explained in detail as follows.

First of all, once an optical disc is loaded in the optical recording and reproducing apparatus, the entire disc management information within the disc is read out to be temporarily stored in the memory 15 of the record playback unit 10. And, various kinds of the disc management information are utilized for the record/playback of the optical disc. Specifically, the management information stored in the memory 15 includes disc information of the present invention. Hence, the recording layer information, writing speed information, and write strategy applicable to the corresponding writing speed recorded within the disc information are read out to be stored in the memory.

For instance, an applicable writing speed and write strategy of the loaded disc are determined based on the flag information indicating applicability of a specific writing speed and write strategy information indicating a usable write strategy type and its parameters included in the management information.

If intending to perform a writing on a specific area within the optical disc, the control unit 20 renders such an intent into a writing command and then delivers it to the record/playback unit 10 together with data for writing location information to be recorded. After receiving the writing command, the microcomputer 16 decides the corresponding writing speed applied to an intended recording layer within the optical disc from the management information stored in the memory 15 and then performs the writing command using the optimal write strategy by referring to the decided writing speed.

Accordingly, the present invention provides various methods of providing disc control information coping with higher writing speed in a high-density optical disc, thereby enabling to uniformly apply the standardized disc control information to efficiently cope with the record/playback of the optical disc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for recording control information on a recording medium having one or more recording layers, comprising:

providing control information, wherein the control information includes one or more recording speed flags indicating respectively whether one or more recording speeds are applicable to a corresponding recording layer, and write strategy information depending on a corresponding applicable recording speed; and recording the control information on a specific area of the recording medium.

2. The method of claim 1, wherein the providing step provides the control information in a manner that the recording speed flag for higher recording speed depends on the recording speed flag for lower recording speed.

3. The method of claim 2, wherein the recording speed flag for higher recording speed is set in connection with the recording speed flag for lower recording speed in such a manner that the recording speed flag for higher recording speed is set to indicate one of available and unavailable status if the recording speed flag for lower recording speed is available while the recording speed flag for higher recording speed is only set to indicate unavailable status if the recording speed flag for lower recording speed is unavailable.

4. The method of claim 1, wherein the corresponding applicable recording speed indicates at least one of a basic recording speed, a maximum recording speed and a minimum recording speed.

5. The method of claim 1, wherein the write strategy information indicates whether a write strategy type is applicable to the corresponding recording layer.

6. The method of claim 1, wherein the control information further includes a flag indicating an optimum write strategy type to be applicable to the corresponding recording layer.

7. An apparatus for recording data on a recording medium having one or more recording layers, comprising:
 a controller configured to provide control information, wherein the control information includes one or more recording speed flags indicating respectively whether one or more recording speeds are applicable to a corresponding recording layer, and write strategy information depending on a corresponding applicable recording speed; and
 a pickup unit, operatively coupled to the controller, configured to read or record the control information on a specific area of the recording medium according to a control of the controller.

8. The apparatus of claim 7, wherein the controller is configured to provide the recording speed flag for higher recording speed depending on the recording speed flag for lower recording speed.

9. The apparatus of claim 8, wherein the recording speed flag for higher recording speed is set in connection with the recording speed flag for lower recording speed in such a manner that the recording speed flag for higher recording speed is set to indicate one of available and unavailable status if the recording speed for lower recording speed is available while the recording speed flag for higher recording speed is only set to indicate unavailable status if the recording speed flag for lower recording speed is unavailable.

10. The apparatus of claim 7, wherein the corresponding applicable recording speed indicates at least one of a basic recording speed, a maximum recording speed and a minimum recording speed.

11. The apparatus of claim 7, wherein the pickup unit is configured to record the control information by using the write strategy information indicating whether a write strategy type is applicable to the corresponding recording layer.

12. The apparatus of claim 7, wherein the pickup unit is configured to record a flag in the control information, the flag indicating an optimum write strategy type to be applicable to the corresponding recording layer.

13. A recording medium having one or more recording layers, comprising:
 a data area for recording user data on a corresponding recording layer; and
 one or more management area for storing control information for controlling recording/reproducing the user data, wherein the control information includes one or more recording speed flags indicating respectively whether one or more recording speeds are applicable to a corresponding recording layer, and write strategy information depending on a corresponding applicable recording speed.

14. The recording medium of claim 13, wherein the recording speed flag for higher recording speed depends on the recording speed flag for lower recording speed.

15. The recording medium of claim 14, wherein the recording speed flag for higher recording speed is set in connection with the recording speed flag for lower recording speed in such a manner that the recording speed flag for higher recording speed is set to indicate one of available and unavailable status if the recording speed flag for lower recording speed is available status while the recording speed flag for higher recording speed is only set to indicate unavailable status if the recording speed flag for lower recording speed is unavailable status.

16. The recording medium of claim 13, wherein the corresponding applicable recording speed indicates at least one of a basic recording speed, a maximum recording speed and a minimum recording speed.

17. The recording medium of claim 13, wherein the write strategy information indicates whether a write strategy type is applicable to the corresponding recording layer.

18. The recording medium of claim 13, wherein the control information further includes a flag indicating an optimum write strategy type to be applicable to the corresponding recording layer.

19. An apparatus for recording control information on a recording medium having one or more recording layers, comprising:
 a controller configured to generate control information, wherein the control information includes one or more recording speed information, recording speed flags indicating respectively whether one or more recording speed included in the recording speed information are applicable to a corresponding recording layer, and write strategy information depending on a corresponding applicable recording speed, wherein the first recording speed flag for higher recording speed depends on whether the second recording speed flag for lower recording speed is applicable to the recording medium; and
 a pickup unit, operatively coupled to the controller, configured to record the control information on a specific area of the recording medium according to a control of the controller.

20. The apparatus of claim 19, wherein the first recording speed flag is set in connection with the second recording speed flag in such a manner that the first recording speed flag is set to indicate one of available and unavailable status if the second recording speed is available while the first recording speed flag is only set to indicate unavailable status if the second recording speed flag is unavailable.

21. The method of claim 19, wherein the recording speed information indicates at least one of a basic recording speed, a maximum recording speed and a minimum recording speed.

22. The method of claim 19, wherein the write strategy information indicates whether a write strategy type is applicable to the corresponding recording layer.

23. The method of claim 19, wherein the control information further includes a flag indicating an optimum write strategy type to be applicable to the corresponding recording layer.

24. A recording medium having one or more recording layers, comprising:
- a pre-recorded area for storing control information for controlling recording/reproducing user data, wherein the control information includes one or more recording speed information, recording speed flags indicating respectively whether one or more recording speeds are applicable to the recording medium, and write strategy information depending on a corresponding applicable recording speed,
- wherein the recording speed information includes a basic recording speed, a maximum recording speed and a minimum recording speed, and the recording speed flags include a first recording speed flag for higher recording speed and a second recording speed flag, the first recording speed flag depending on the second recording speed flag.

25. The recording medium of claim 24, wherein the first recording speed flag is set in connection with the second recording speed flag in such a manner that the first recording speed flag is set to indicate one of available and unavailable status if the second recording speed is available while the first recording speed flag is only set to indicate unavailable status if the second recording speed is unavailable.

26. The recording medium of claim 25, wherein the write strategy information includes write strategy parameters for one or more recording speeds.

27. An apparatus for reproducing or recording data from or on an optical recording medium, comprising:
- an optical pickup configured to read or record data from or on the optical recording medium;
- a servo, operatively coupled to the optical pickup, configured to control a servo operation of the optical pickup according to a specific recording speed;
- a memory configured to store control information, the control information including one or more recording speed information, recording speed flags indicating respectively whether one or more recording speeds are applicable to the recording medium, and write strategy information depending on a corresponding applicable recording speed, wherein the recording speed information includes a basic recording speed, a maximum recording speed and a minimum recording speed, and the recording speed flags include a first recording speed flag for higher recording speed and a second recording speed flag, the first recording speed flag depending on the second recording speed flag; and
- a controller, operatively coupled to the optical pickup, servo and memory, configured to identify the control information stored in the memory and to control the optical pickup to read or record the control information from or on a specific area of the recording medium.

28. The apparatus of claim 27, wherein the memory is configured to further store write strategy parameters for a corresponding recording speed being applicable to the optical recording medium and the controller is configured to utilize the write strategy parameters during recording data.

29. The apparatus of claim 28, wherein the recording speed flags are configured in a manner that the first recording speed flag is set to indicate one of available and unavailable status if the second recording speed flag is available status while the first recording speed flag is only set to indicate unavailable status if the second recording speed flag is unavailable status, wherein the controller is configured to control the optical pickup to record the data on the recording medium based on the recordable speed flag.

* * * * *